Oct. 31, 1950     L. D. MEISER     2,528,382
TESTING DEVICE FOR WRINGERS
Filed May 20, 1947     2 Sheets-Sheet 1
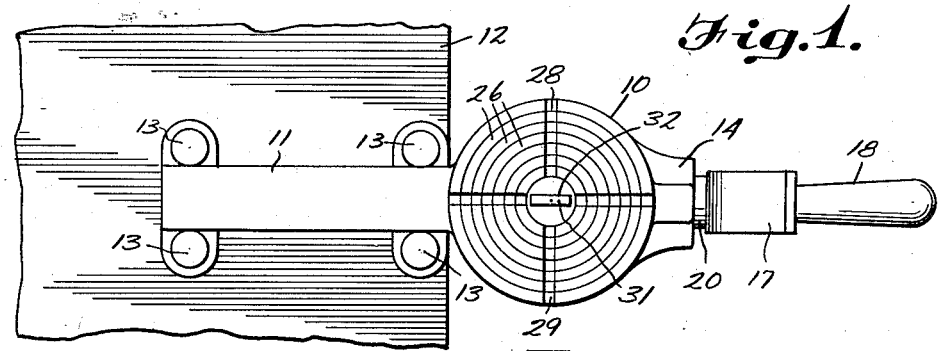
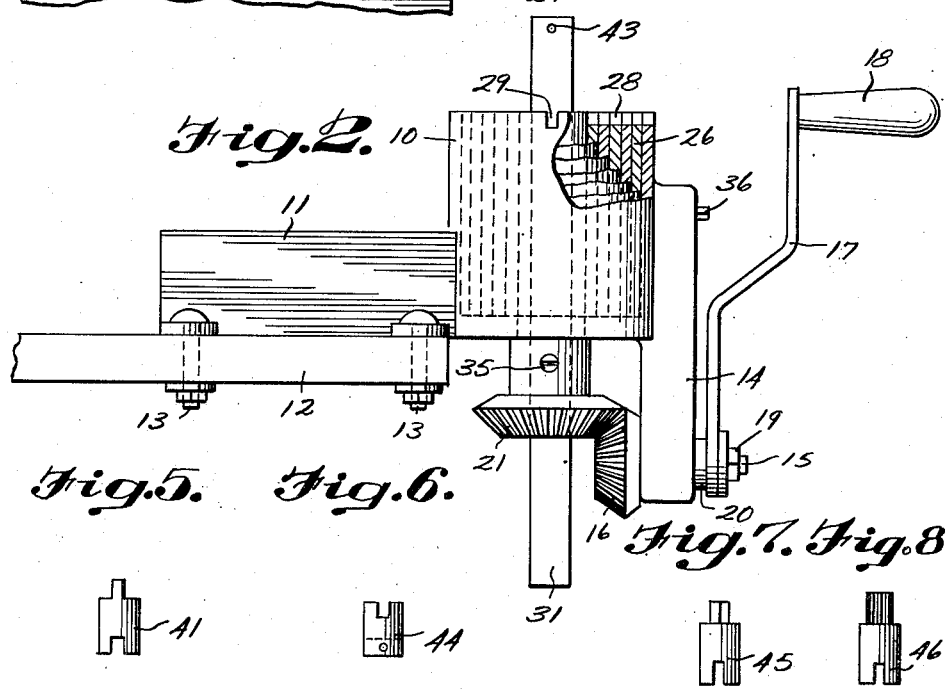
   
 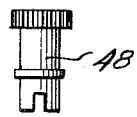
INVENTOR.
Lester D. Meiser,
BY Victor J. Evans & Co.
ATTORNEYS Oct. 31, 1950 — L. D. MEISER — 2,528,382
TESTING DEVICE FOR WRINGERS
Filed May 20, 1947 — 2 Sheets-Sheet 2

INVENTOR.
Lester D. Meiser,
BY Victor J. Evans & Co.
ATTORNEYS

Patented Oct. 31, 1950

2,528,382

UNITED STATES PATENT OFFICE 2,528,382

TESTING DEVICE FOR WRINGERS

Lester D. Meiser, Bucyrus, Ohio

Application May 20, 1947, Serial No. 749,305

2 Claims. (Cl. 74—417)

This invention relates to an apparatus for testing the wringers of washing machines.

An object of the invention is to provide a hand operated compact testing device that is adapted to test most of the wringers in use at the present time.

Another object of the invention is to provide a device of this character that provides a plurality of adapters for use in testing wringers, such adapters being easily installed and removed as desired.

With the above and other objects and advantages in view, the invention consists of the novel details of construction, arrangement and combination of parts more fully hereinafter described, claimed and illustrated in the accompanying drawings in which:

Figure 1 is a top plan view of an embodiment of the invention;

Figure 2 is a side elevation thereof partly broken away and partly in section to show the interior mechanism thereof;

Figure 3:
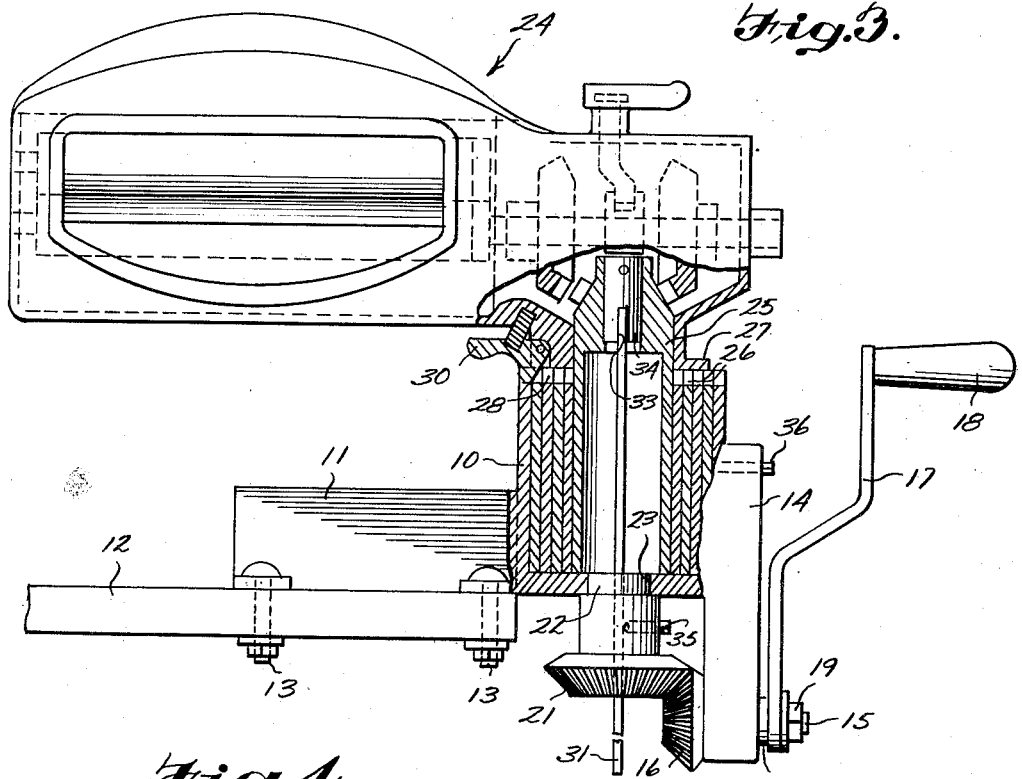
Figure 3 is an elevational view partly in section showing a wringer mounted on the apparatus for cooperation therewith.

Referring more in detail to the drawings, the apparatus embodying the invention comprises the open top, closed bottom, tubular housing 10 provided with the right angularly laterally extending projection 11, whereby the housing 10 is secured to a suitable support 12 by fasteners 13. The housing 10 is provided with the right angularly depending projection 14, which is formed thereon in opposed relation to the projection 11, and a shaft 15 is journalled in the lower end of the projection 14. The shaft 15 has fixed thereto on one end thereof, the bevelled gear 16, while a crank 17, having a handle 18, is fixed to the opposite end of the nut 19, the crank 17, being spaced from contact with the projection 14 by means of a space washer 20.

Meshing with and supported by the gear 16 is a complementary shaped gear 21 which, by means of the reduced end 22, is rotatably mounted in the aperture 23 in the bottom of the housing 10.

In the invention shown in Figure 3, the form of wringer 24 shown comprises a tubular projection 25 which is adapted to be placed in the housing 10, as shown, and since the projection 25 is of a smaller circumference than the interior of the housing 10 shims, bushings or sleeves 26 of varying sizes are positioned in the housing 10 to rigidly fix the projection 25 therein. The wringer is provided with a base flange 27 which rests on the top of the sleeves 26, and the sleeves are provided with notches 28 as is the housing 10, with notches 29, which, when alined, will receive the latch 30 on the wringer to hold the wringer in fixed relation to the housing 10. A bar 31 is inserted into the central slot 32 in the gear 21, and extends upwardly into the projection 25 to enter the slot 33 in the shaft 34 of the wringer, and a set screw 35 in the gear 21 holds the bar 31 in the slot 33 and a set screw 36 in the projection 14, when tightened, will hold the sleeves 26 in fixed relation to each other within the housing.

Figure 4:
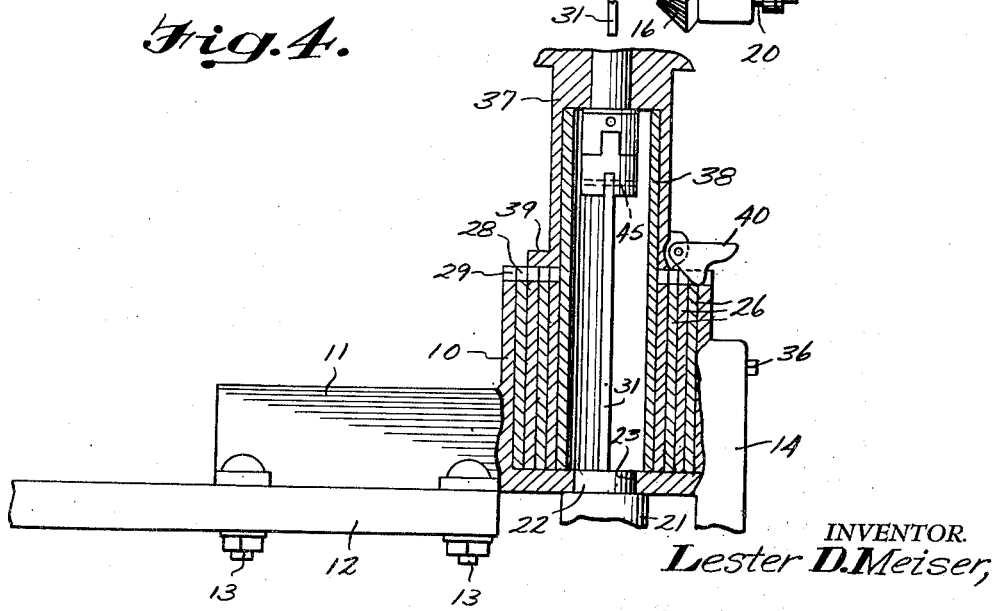
Figure 4 is a detailed sectional view of another method of mounting a wringer on the apparatus and Figures 5 to 10 inclusive are elevational views of adapters for use with the apparatus.

In Figure 4, the wringer 37 shown, does not include in its structure a projection similar to the projection 25, so an adapter 38 must be used in lieu thereof, so that the base flange 39 thereof will rest on the sleeves 26, and the latch 40 will engage the notches 28 and 29. The bar 31 in this instance has the adapter 41 shown in Figure 5 fixed to the upper end thereof by a pin 42 which is inserted in the aperture 43 in the upper end of the bar to fix the adapter 41 thereto.

In Figures 6 to 10 inclusive, there are shown other forms of adapters 44, 45, 46, 47 and 48 respectively, which are adapted to be secured to the upper end of the bar 31 for engagement with the wringer operating mechanism for the operation thereof.

In operation, the wringer is mounted on the apparatus as shown in Figure 3 or Figure 4, or it may be mounted in any other fashion that is adaptable to the type of wringer to be tested. The sleeves 26 are placed in the body 10, and the bar 31 is inserted into the gear 21 after the proper adapter has been placed on the end thereof. By rotating the crank 17, the wringer rolls are rotated by hand for the testing thereof.

There has thus been provided a simple, efficient testing mechanism for wringer rolls, and the other mechanism forming the complete wringer assembly, and it is believed that from the foregoing description, the structure and operation of the mechanism will be apparent to those skilled in the art. It is also to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. In a support for testing a clothes wringer having gear actuating means thereon for rotating the wringer the improvement comprising a tubular body portion, a projection on said body portion, extending at right angles therefrom which is adapted to be secured to a suitable support for retaining said body portion in fixed relation to said support, a depending projection on said body for supporting the gear actuating means, means receivable in said body for mounting a clothes wringer thereon, and means extending through said body and said means and coacting with said gear actuating means and with said wringer whereby operation of said gear actuating means will cause the rotation of said wringer.

2. The invention as in claim 1, wherein a plurality of shims are inserted in the tubular body portion for supporting said wringer thereon to retain said wringer in position on said tubular body portion as said wringer is retained in position on a washing machine.

LESTER D. MEISER.

REFERENCES CITED

The following references are of record in the file of this patent:

UNITED STATES PATENTS

| Number | Name | Date |
| --- | --- | --- |
| Re. 14,315 | Orban | June 12, 1917 |
| 707,673 | Blevney | Aug. 26, 1902 |
| 1,790,584 | Hirschy | Jan. 27, 1931 |
| 2,055,960 | Betz | Sept. 29, 1936 |